(12) United States Patent
Wright

(10) Patent No.: US 6,217,262 B1
(45) Date of Patent: *Apr. 17, 2001

(54) EDGE MILLING CUTTER WITH CUTTER INSERTS

(76) Inventor: Galen Ross Wright, The Boeing Company, P.O. Box 3707, M/S 13-08, Seattle, WA (US) 98124-2207

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,730

(22) Filed: Dec. 21, 1996

(51) Int. Cl.$^7$ ........................................... B23C 5/24
(52) U.S. Cl. .................. 407/40; 407/43; 407/46; 407/53; 407/51
(58) Field of Search .................. 407/40, 33, 34, 407/35, 43, 46, 48, 49, 53, 51, 119; 82/1–11, 47

(56) References Cited

U.S. PATENT DOCUMENTS

| | | | |
|---|---|---|---|
| 3,300,834 | * | 1/1967 | Stone ...................................... 407/35 |
| 4,243,348 | | 1/1981 | Paige . |
| 4,733,995 | * | 3/1988 | Aebi ................................... 407/48 X |
| 4,946,318 | | 8/1990 | David et al. ........................... 407/42 |
| 4,966,500 | | 10/1990 | Tsujimura et al. ..................... 407/34 |
| 4,988,241 | | 1/1991 | Colligan ................................. 407/51 |
| 5,033,916 | | 7/1991 | Dunklau ................................. 407/33 |
| 5,123,786 | * | 6/1992 | Yates et al. ........................ 407/35 X |
| 5,188,487 | | 2/1993 | Okawa et al. .......................... 407/34 |
| 5,294,219 | | 3/1994 | Shiratori et al. ....................... 407/34 |
| 5,364,209 | * | 11/1994 | Santhanam et al. ................. 407/119 |
| 5,431,072 | * | 7/1995 | Christoffel ....................... 407/119 X |
| 5,655,860 | * | 8/1997 | Oles .................................. 407/34 X |
| 5,704,736 | * | 1/1998 | Giannetti ............................ 407/48 X |

FOREIGN PATENT DOCUMENTS 0 620 070 A1    4/1993   (EP) .

* cited by examiner

Primary Examiner—Henry Tsai
(74) Attorney, Agent, or Firm—Lawrence W. Nelson

(57) ABSTRACT

This invention relates to a high speed milling tool for deburring or edge radiusing of machine parts. This tool comprises a plurality of cutter inserts having corresponding edges whereby each edge mills only a portion of the machine part radius. This requires a full revolution of the tool producing a faceted approximation of the cut radius to make a complete cut. The tool offers significant improvement in part feedrate in high speed milling applications requiring either a longer tool reach or set length or parts having taller or thinner edges without effects of deflection or chatter between the part and tool.

12 Claims, 5 Drawing Sheets

EDGE MILLING CUTTER WITH CUTTER INSERTS

FIELD OF INVENTION

The present invention relates to a high speed milling tool for deburring and edge radiusing of machine parts.

BACKGROUND INFORMATION

Present cutters available for deburring and edge radiusing are standard concave radius tools. These cutters use multiple concave shaped cutter surfaces. One prior art embodiment uses multiple inserts having a concave shaped cutter area as shown in FIG. 1. The inserts 1 can be either integral or detachable to the tool 7 and each insert cuts the same surface area on the machine part. These tools work satisfactorily with low rotation per minute (rpm) and low feedrate applications. The feedrate is the relative movement of the tool in the direction of the part axis (inches/minute). The detachable inserts are held on the tool 7 by a set screw 3 or other suitable fastener. A concave shaped cutter area is shown at 9. The detachable inserts are held on the tool 2 by a set screw 3 or other suitable fastener. A concave shaped cutter area 9 in shown at 4.

FIG. 2 shows a schematic of a prior art insert 1 with a concave shaped cutter area overlapping the top edge of a machine part 6 having top and bottom edges. Standard concave radius cutters have a large contact area 4 with the part 6 resulting in a sudden and dramatic increase in cutter forces at high rpm's and feedrates, causing the part and cutter to deflect from each other. Their use in high speed milling applications causes deflection and springback between the part and the tool resulting in excessive chatter and unacceptable part surface finish. The chips resulting from a standard concave radius cutter curl then split also producing unacceptable part surface finish. As the edge of the part becomes thinner or the flange gets longer, the amount of chatter or deflection between the part and tool may increase. The feedrate is dependent upon the rigidity of the tool which in turn depends upon its length to diameter ratio. For instance, a tool having a 7:1 length to diameter ratio would require a feedrate of less than about 8 inches per minute on aluminum or in applications where the surface quality is not important. Another limitation of this tool is an application requiring long reach or set length to the cutter surface. Here, the tool becomes less rigid providing less support in high rpm applications.

Machine parts can also be deburred and edge radiused using electric or air powered hand tools. These tools include rotary files and rotary sanders sometimes operating at faster feedrates than using standard concave radius cutters. Rotating files are used to round or radius a parts edge. Rotating sanders use either cylinders or disks to smooth part surfaces. Rotary buffers are used to produce a smooth finish. All hand tools have the disadvantage of potentially undercutting or unintentionally removing part material. Hand tools can also have the disadvantage of limited access to part features that require long reach including edges and ledges.

Previously, it was more cost effective to debur or radius edges by hand due to excessive machine costs. More recently, the availability of high speed machining allowing speeds of at least 10,000 rpm has become economically competitive with hand tools.

SUMMARY OF THE INVENTION

The invention features a milling tool employing a plurality of cutter inserts having corresponding edges whereby each edge mills only a portion of the part radius. This requires a full revolution of the tool to make a complete cut producing a faceted approximation to the cut radius.

Another feature of the invention is to offer significant improvement in part feedrate in applications requiring longer reach or set length.

Still another feature of the invention is to provide a milling tool having a top milling radius cutter.

Still another feature of the invention is to provide a milling tool having a bottom milling radius cutter.

Still another feature of the invention is to provide a milling tool having a top and bottom milling radius cutter.

These and other advantages and features will become more apparent from the detailed description of the invention that follows.

DETAILED DESCRIPTION OF THE INVENTION

The previously noted limitations associated with standard concave radius cutters is solved in this invention by the "facet effect" of generating only a portion of the edge radius with each insert cutter surface. Three cutters are developed for high speed machining which approximates a concave cutter radius for milling the top edge and the bottom edge of a part. The first two cutters are for milling the tops and bottoms of edges. This is accomplished by using standard triangular shaped carbide indexable inserts, each rotated to a different elevation angle to produce a faceted approximation of a constant radius. Tungsten-carbide based inserts retain their hardness at higher temperatures. The third cutter uses square shaped inserts and can mill both the tops and bottoms of edges. These cutters are used in high speed machining to debur or edge radius the machine part from above. The advantages for using inserts include the elimination of the need for replacement of the entire tool body and the capability for milling parts at carbide speeds which can exceed 10,000 rpm. Using inserts that are both indexable and replaceable results in a milling tool having a longer life span than a concave radius tool.

Figure 1:
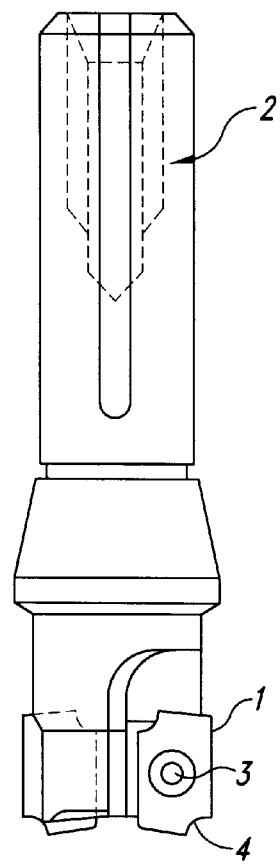
FIG. 1 is a side view of a prior art standard concave radius tool.
Figure 2:
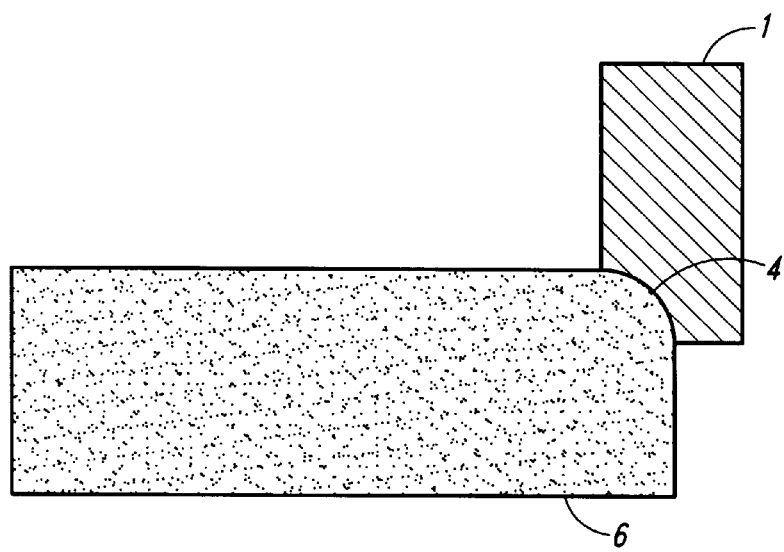
FIG. 2 is a schematic depiction of a prior art cutter insert and machine part.
Figure 3:
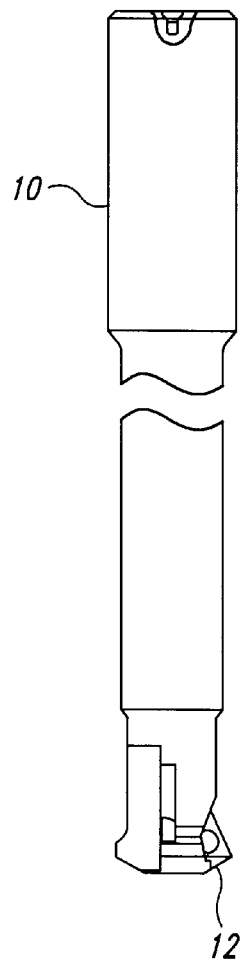
FIG. 3 is a side view of the milling tool of the invention.
Figure 4:
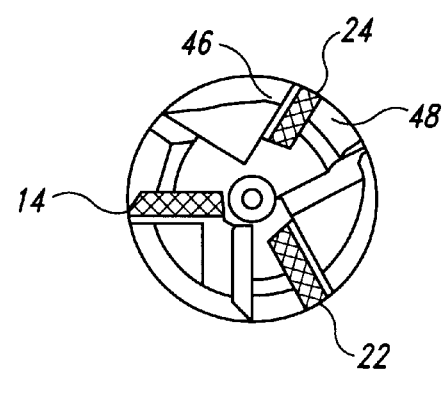
FIG. 4 is an end view of the milling head.

The basic structure of the milling tool is shown in FIG. 3 and consists of a cutter body 10 with a cutter head 12 at the bottom end. The radius of the cutter body 10 may also be tapered. The cutter body 10 is of generally circular cross section having an axis of rotation therethrough and can be fabricated using a heat treated steel shaft. This tool steel can maintain cutter hardness at elevated temperatures and generally includes two alloying elements, tungsten or molybdenum or a combination of both. FIG. 4 shows an end view of the tool including the inserts 14, 22, 24, each insert has two faces 46, 48.

Figure 5:
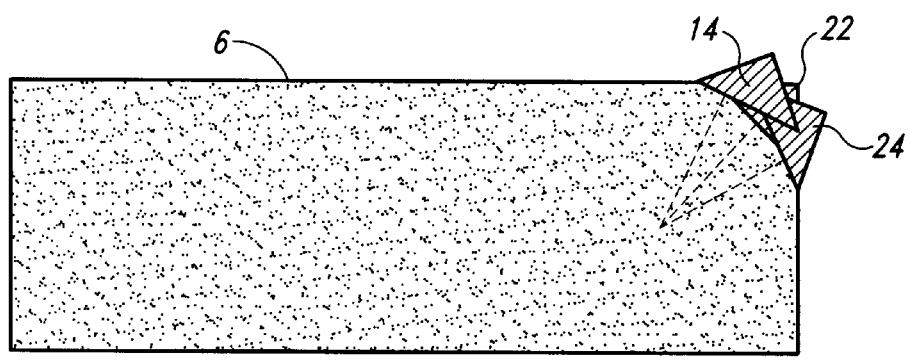
FIG. 5 is a schematic depiction of the cutter inserts of the invention and the machine part.
Figure 6A:
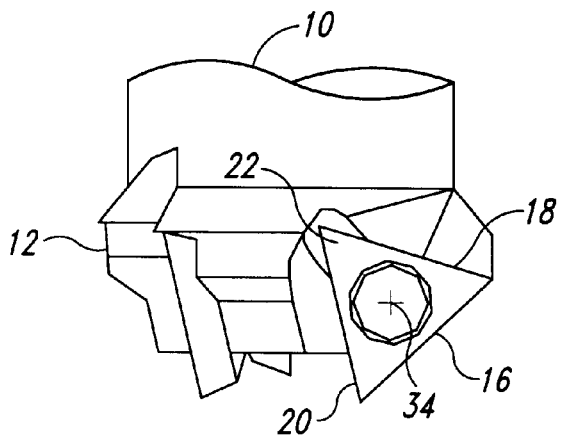
FIG. 6a is a rotated view of the top edge milling tool with triangular insert rotated minus 18 degrees from center insert.
Figure 6B:
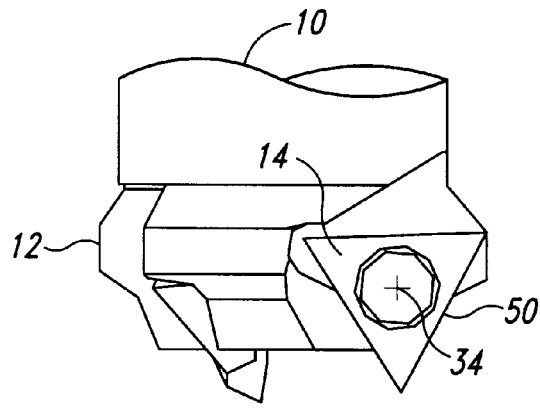
FIG. 6b is a rotated view of the top edge milling tool with center insert.
Figure 6C:
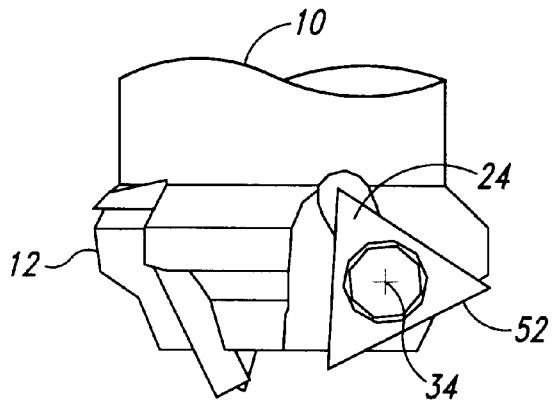
FIG. 6c is rotated view of the top edge milling tool with triangular insert rotated plus 18 degrees from center insert.

FIG. 5 schematically depicts the inserts 14, 22, 24 overlapping the cutter area of the top edge of a machine part 6. The top edge cutter head 12 is shown in FIG. 6a to 6c and can be produced having various diameters with three or more inserts and approximating any number of edge radii. A typical cutter tool is one inch or less in diameter and having three inserts 14, 22, 24, each insert is shaped like a triangle having two faces 46, 48 with each face having three edges 16, 18, 20 for a total of three sets of edges. These inserts can also be tapered between the faces resulting in only three cutter surfaces. The inserts are positioned circumferentially around the end of the cutter body.

Figure 7:
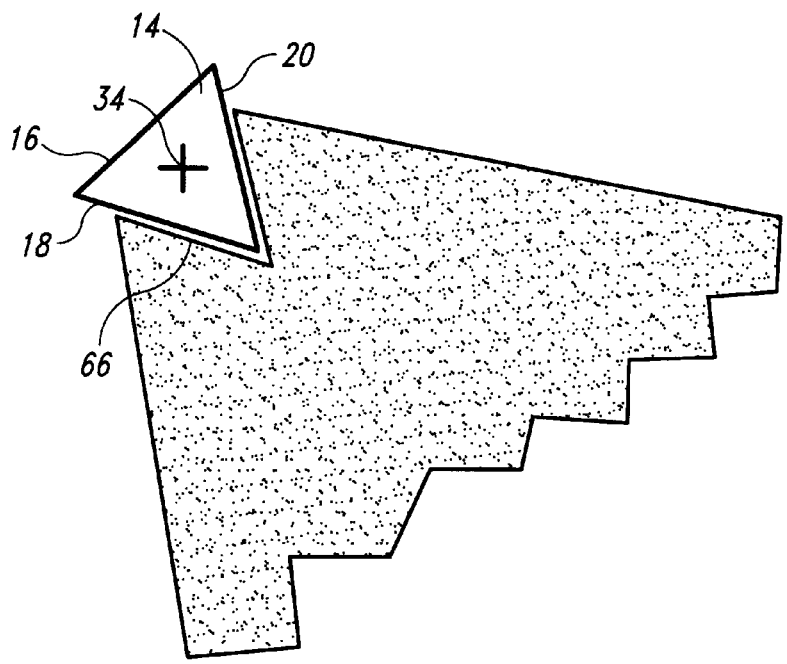
FIG. 7 shows cutter insert recessed into a v-shaped groove in milling head.

The center insert edge is set at 45 degrees with respect to the cutter axis of rotation and placement of the other two inserts 22, 24 is rotated +/−18 degrees from the center insert. The inserts are located 120 degrees apart about the axis of the cutter body with a total of 3 outward cutter edges 16, 50, 52. Each insert is recessed into the body with a single outward edge 16. The other two edges 18, 20 are recessed into a seat 66 as shown in FIG. 7. This seat is a triangle shaped concave cutout or v-shaped groove in the cutter head and provides mechanical support to the insert 14 during the cutter action.

The cutter inserts are also detachably mounted to the cutter head. A set screw 34 is threadedly engaged with the insert and the cutter head. The inserts can be rotated or indexed so that any of the unused edges are available as cutter surfaces. Commercially available inserts come in a variety of shapes including triangular, square, round, concave, or convex. The inserts can also be oriented at a variety of rake angles. The rake angle is the angle formed between the face of the insert and the normal of the axis of rotation of the tool. The rake angle can be positive for producing a shearing action and resulting in slicing the part material instead of plowing the material for zero rake, or at a negative rake angle for planing the part material. For a zero rake, the material is plowed from the part and may result in rough surface on the part. Shearing or planing the part can result in most of the heat being transferred to the material removed from the part. This prevents the part from heating up and expanding. A larger rake angle provides increased mechanical support for the inserts, improving insert support and tool rigidity. This is particularly important for tools having a small radius. A typical rake angle is +10 degrees but can be optimized for a particular application.

After a complete revolution of the cutter tool, a faceted approximation to the required cut radius is produced at a point along the edge of the machine part. The cutter tool is then advanced along the edge of the machine part 6 whereby the cutter action is repeated or until the edge radiusing is complete.

Figure 8A:
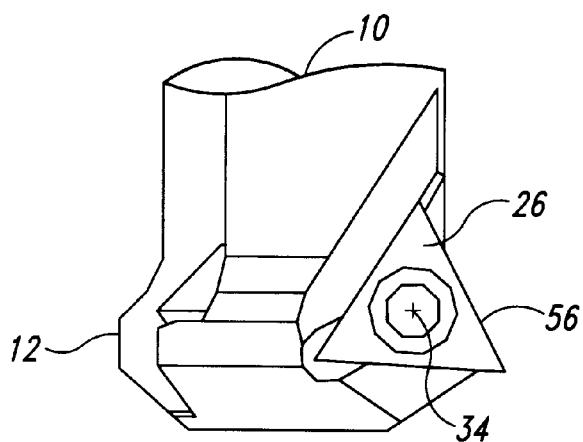
FIG. 8a is a rotated view of the bottom edge milling tool with triangular insert rotated minus 18 degrees from center insert.
Figure 8B:
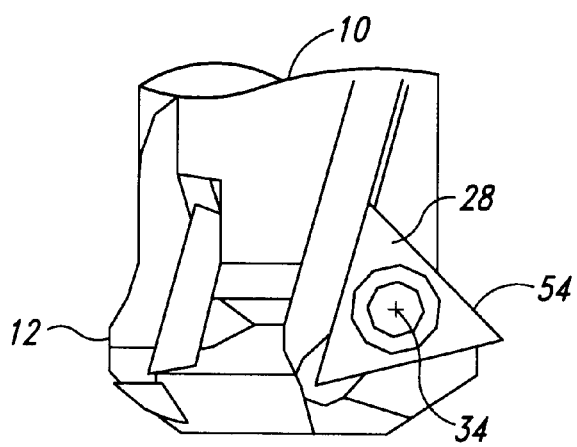
FIG. 8b is a rotated view of the center insert.
Figure 8C:
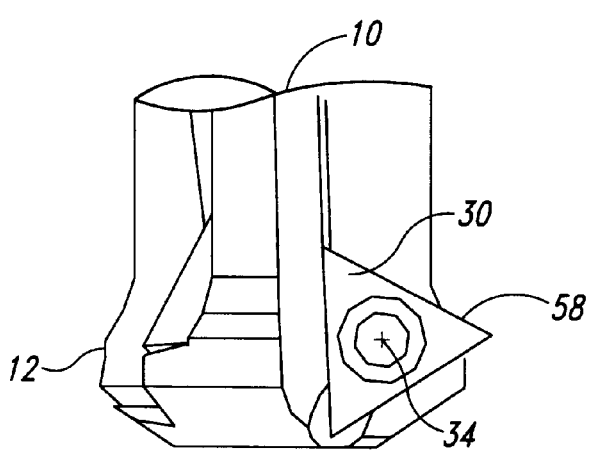
FIG. 8c is a rotated view of the bottom edge milling tool with triangular insert rotated plus 18 degrees from center insert.

The bottom edge cutter head 12 is shown in FIG. 8a to 8c and was developed using three triangular inserts 26, 28, 30 with the center insert cutter edge 54 set at 135 degrees with respect to the cutter axis of rotation. The other two inserts with cutter edges 56, 58 are rotated +/−18 degrees from the center insert. The inserts are located 120 degrees apart about the axis of the cutter body 10. The radius of the bottom cutter head is greater than that of the cutter body 10 to provide clearance between the cutter edges and the part material 6.

Figure 9:
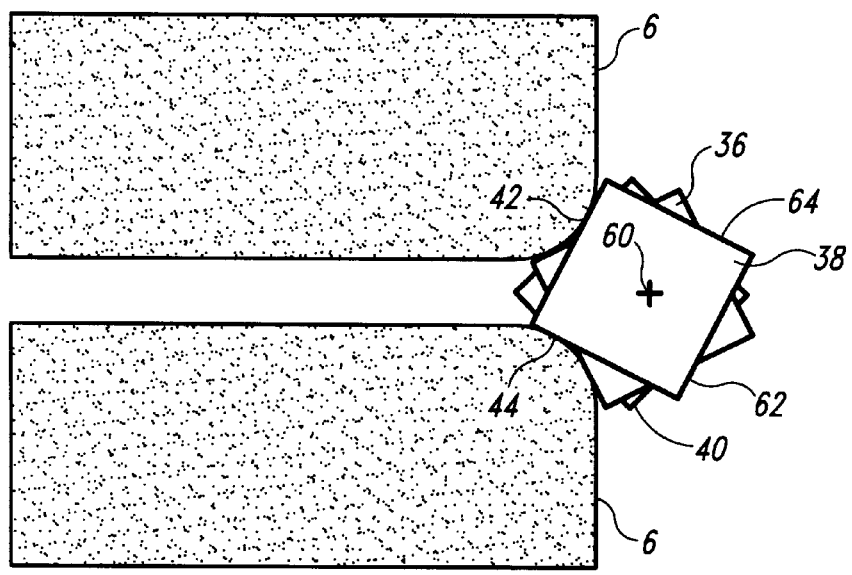
FIG. 9 shows rotated views of the combined top and bottom edge milling tool showing square inserts.

The features of both the top edge and bottom edge nilling heads can be combined into a single cutter. This tool is schematically depicted in FIG. 9 and uses square inserts set at various angles to achieve a faceted approximation of the cut radius. Each insert 36, 38, 40 is shaped like a square having two faces with each face having four edges 42, 44, 62, 64 for a total of four sets of edges. The inserts are positioned circumferentially around the end of the cutter body. Each insert is recessed into the body with two outward sets of edges 42, 44. A corner of the square insert is at an acute angle with the cutter body and provides upward sloping and downward sloping cutter edges. Each insert has two sets of upward sloping and downward sloping edges. The inserts are located 120 degrees apart about the axis of the cutter body.

The cutter inserts 1 are detachably mounted to the cutter head. A mounting screw 60 is threadedly engaged with the insert and the cutter head. The inserts can be rotated so that any of the edges are available as cutter surfaces. The inserts can be oriented at a variety of rake angles. The rake angle is the angle formed by the face of the insert and the normal of the axis of rotation of the tool. The rake angle can be positive for increasing the shearing action resulting in slicing the part material instead of plowing the material for zero rake, or at a negative rake angle for planing the part material. For a zero rake the material is plowed from the part and may result in rough surface. A larger rake angle also provides increased mechanical support for the inserts improving insert support and tool rigidity. This is particularly important for tools having a small radius. A typical rake angle is +10 degrees but can be optimized for a particular application.

This cutter concept enhances high speed machining technology requirements. These edge cutters are capable of being run at 10,000 rpm or greater and feedrates of 60 inches per minute or greater. Radius approximating cutters can be fabricated having a wide range of diameters with three or more inserts of various shapes and sizes set at various angles to approximate any edge radius desired.

In summary, disclosed is a tool for performing a method for edge radiusing of machine parts, which comprise the steps of:

(a) setup the machine part and a cutter insert having a straight edge to a small angle with respect to the top surface of the machine part and, (b) shave the edge of the machine part using the said cutter insert, (c) rotate edge of said cutter insert and thereby increase the angle of the cutter edge with respect to the top surface of the machine part, (d) repeat step (b) until a faceted approximation to the required cut radius is produced, and (e) step along edge of machine part, repeat step (a) or until end of machine part is reached.

What is claimed is:

1. A high speed milling tool for radiusing and deburring edges of machine parts at speeds including 10,000 rpm, said tool comprising:

(a) a cutter body of generally circular cross section having a first and second end and an axis of rotation therethrough;

(b) a plurality of triangular shaped carbide indexable cutting inserts;

said cutting inserts are further defined with first and second faces, each face having three peripheral cutting edges;

said cutting inserts positioned circumferentially and releasably mounted and rotatable about mounting points 120 degrees apart within a plane normal to said axis of rotation, said cutting inserts being partially recessed into the first end of said body with a single outward cutting edge;

said cutting inserts are rotated to generate points on the edge of the machine part tangent with the cutting edge of said insert in such a manner to produce a faceted approximation to a required cut radius; and said cutting inserts are oriented with an upper edge away from the tool and a lower edge away from the tool and serve as both a top edge and bottom edge cutter, wherein only one insert is contacting the machine part at one time during the cutting operation.

8. A milling tool for radiusing and deburring edges of machine parts as recited in claim 7, wherein the first and second faces of each of said cutting inserts are oriented at an angle to the normal of the axis of rotation of said body thereby providing a rake angle to one of the first and second faces of said cutting inserts.

9. A milling tool for radiusing and deburring edges of machine parts as recited in claim 7, wherein radius of first end of said body is greater than second end of said body to provide clearance between edge of said cutting insert and the machine part material.

10. A milling tool for radiusing and deburring edges of machine parts as recited in claim 7, wherein cutting inserts are rotated to expose either set of peripheral cutting edges.

11. A milling tool for radiusing and deburring edges of machine parts as recited in claim 2, wherein said rake angle is approximately +10 degrees.

12. A high-speed milling tool for deburring edges of machined parts, said tool comprising:

a cutter body of generally circular cross section having a first and second end and an axis of rotation therethrough, wherein said cutter body includes a cutting head positioned at the forward end of said cutter body;

a first, second, and third triangular shaped carbide indexable cutting insert, each rotatably mounted about a fastening point within one plane normal to the axis of rotation, and spaced 120 degrees apart about the axis of rotation of the cutter body, each of said first, second, and third triangular cutting insert including:

an outer face and an inner face, wherein said outer face has a cutting edge, wherein said cutting edge of said second insert is set at 45 degrees with respect to the axis of rotation, and said cutting edge of said first and third inserts are rotated plus and minus 18 degrees, respectively, from the cutting edge of said second insert, and wherein only one of said first, second, and third inserts is contacting said machine part at one time while performing the deburring edges of the machine parts.

2. A milling tool for radiusing and deburring edges of machine parts as recited in claim 1, wherein the first and second faces of each of said cutting inserts are oriented at an angle to the normal of the axis of rotation of said body thereby providing a rake angle to one of the first and second faces of said cutting inserts.

3. A milling tool for radiusing and deburring edges of machine parts as recited in claim 1, wherein said cutting inserts are rotated to expose any of the peripheral cutting edges.

4. A milling tool for radiusing and deburring edges of machine parts as recited in claim 1, wherein peripheral edges of said cutting inserts are oriented upward and towards said cutter body and serves as a top edge milling cutter.

5. A milling tool for radiusing and deburring edges of machine parts as recited in claim 1, wherein peripheral edges of said cutting inserts are oriented downward and towards said cutter body and serves as a bottom edge milling cutter.

6. A milling tool for radiusing and deburring edges of machine parts as recited in claim 5, wherein radius of first end of said body is greater than second end of said body to provide clearance between edge of said cutter insert and the machine part material.

7. A high speed milling tool for radiusing and deburring edges of machine parts and operating at speeds including 10,000 rpm, said tool comprising:

(a) a cutter body of generally circular cross section having a first and second end and an axis of rotation therethrough;

(b) a plurality of square shaped carbide indexable cutting inserts;

said cutting inserts are farther defined with first and second faces, each face having four peripheral cutting edges;

said cutting inserts positioned circumferentially and releasably mounted and rotatable about mounting points 120 degrees apart within a plane normal to said axis of rotation, said cutting inserts being par-

* * * * *